Feb. 1, 1927.
H. T. BRADY ET AL
1,616,301
CAMERA
Filed May 18, 1925
2 Sheets-Sheet 1
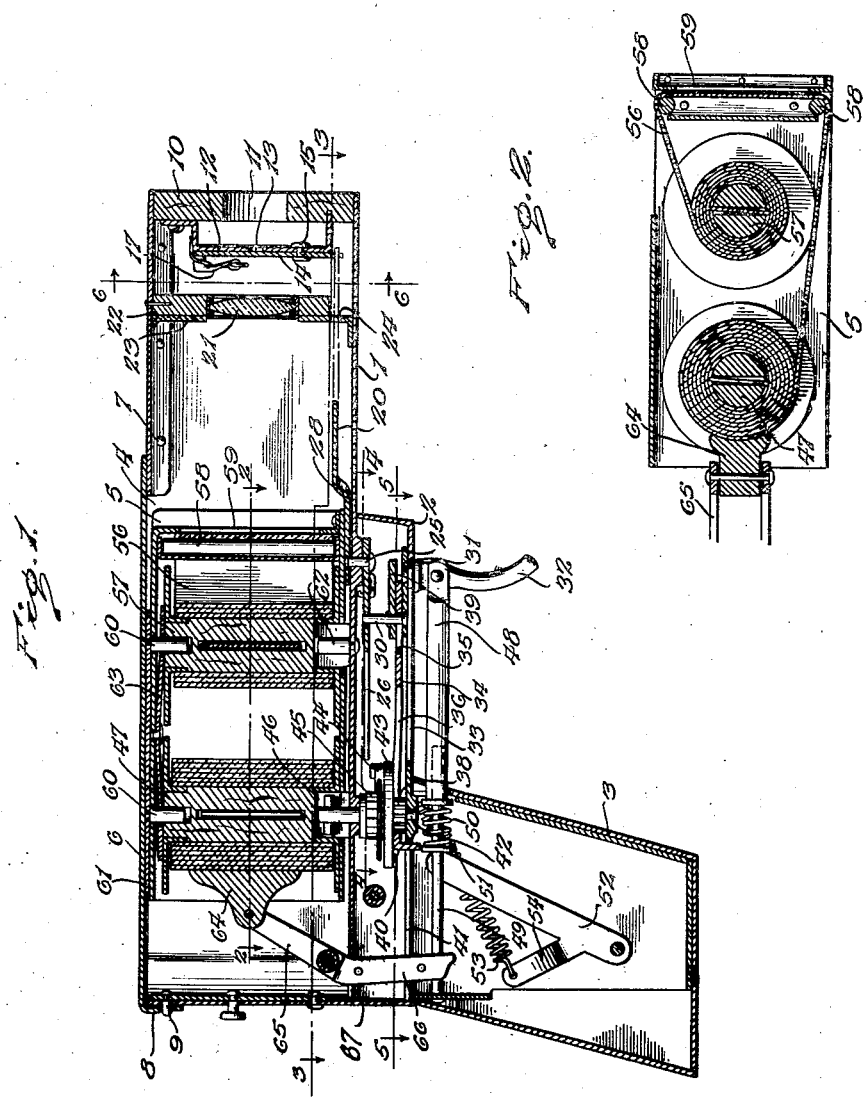
Inventor
W. E. Van Ness
H. T. Brady
D. A. Benway
By
Lacey & Lacey, Attorneys Feb. 1, 1927.　　　H. T. BRADY ET AL　　　1,616,301
CAMERA
Filed May 18, 1925　　　2 Sheets-Sheet 2
Fig. 3.
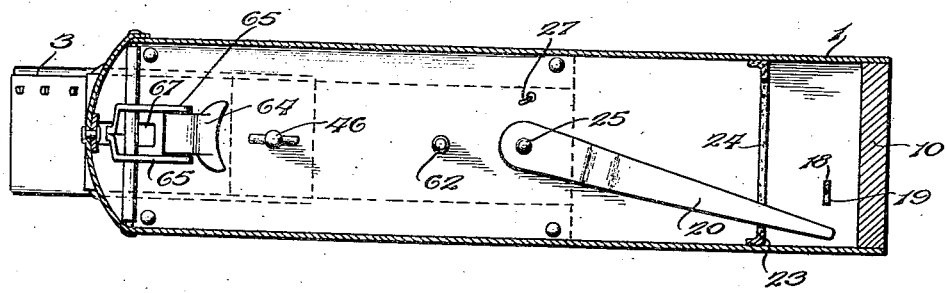
Fig. 4.
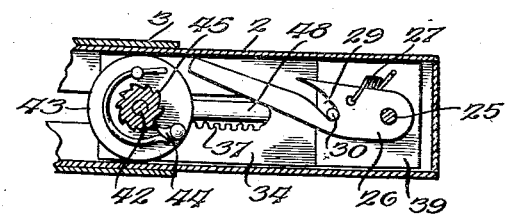
Fig. 6.
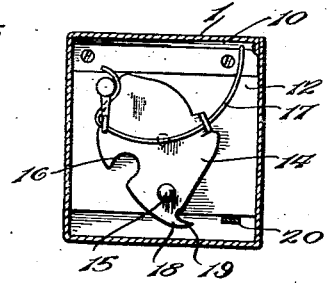
Fig. 5.
Fig. 7.
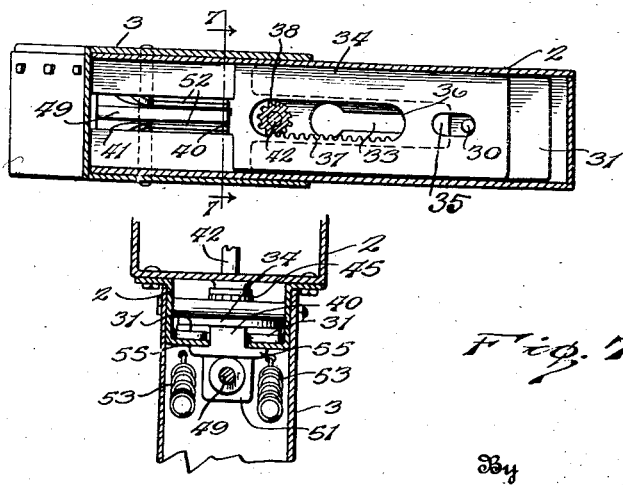
Inventor
W. E. Van Ness
H. T. Brady
D. A. Benway
By Lacey & Lacey, Attorneys Patented Feb. 1, 1927.

1,616,301

UNITED STATES PATENT OFFICE.

HUGH T. BRADY AND DAVID A. BENWAY, OF BAY CITY, AND WILLIAM E. VAN NESS, OF DETROIT, MICHIGAN.

CAMERA.

Application filed May 18, 1925. Serial No. 31,050.

This invention relates to cameras and has for its object the provision of a camera which may be conveniently held and operated by one hand and in which the feeding of the film will automatically follow the exposure. The invention seeks to provide a camera of the stated type in which the films may be easily inserted or removed and in which the manipulation of a single element will effect exposure and subsequently feed the film through a distance sufficient to bring into exposing position another section of the film. The invention also seeks to provide a camera in which the working parts will be compactly arranged and all housed within the casing so that damage thereto will be avoided. All these objects, and other objects which will incidentally appear in the course of the following description, are attained in such a camera as is illustrated in the accompanying drawings, and the invention resides in certain novel features which will be particularly pointed out in the appended claims.

In the drawings:

Figure 1 is a central longitudinal section of one embodiment of our invention;

Fig. 2 is a detail horizontal section on the line 2—2 of Fig. 1;

Fig. 3 is a similar section on the line 3—3 of Fig. 1;

Fig. 4 is a detail section on the line 4—4 of Fig. 1;

Fig. 5 is a similar view on the line 5—5 of Fig. 1;

Fig. 6 is a transverse section on the line 6—6 of Fig. 1, and

Fig. 7 is a transverse section on the line 7—7 of Fig. 5.

In carrying out our invention, we employ a casing comprising a main tubular portion 1, to the under side of which is secured a supplemental casing or box 2 extending along the rear end portion of the main casing and to the rear end of this box 2 is secured a depending handle member or casing 3. The casing 3, as shown clearly in Fig. 1, inclines rearwardly from the box 2 so that the entire housing of the device has a general resemblance to a pistol and may be very easily and conveniently held in one hand. In the top of the main casing 1 is an opening 4 which extends through the greater portion of the length of the casing and provides for the entrance and withdrawal of the carrier or holder 5 in which the film is mounted. A cover 6 is pivotally mounted at its front end, as indicated at 7, upon the main casing 1 in advance of the opening 4 and extends over the entire opening and is equipped at its rear end with a depending tongue 8 adapted to engage over a stud 9 on the rear end of the casing whereby it will be retained in closed position. In the front end of the casing 1 is a plug 10 constituting a screen for the lens and having a central opening 11 to admit light to the lens. Carried by the rear side of this screen plug 10 is a shield 12 having a small central opening 13 and pivotally mounted upon the said shield is the shutter 14, the pivot 15 being disposed below the opening 13, as shown most clearly in Fig. 6, and the shutter being provided at a proper point in its edge with a notch 16 which is adapted to aline with the opening 13 when the shutter is manipulated to make an exposure. The shutter is held normally in its closed position, presenting an imperforate portion to the eye or opening 13, by a spring 17 operating in a well-known manner.

At the lower end of the shutter is a projection 18 extending below the lower edge of the shield 12 and provided with a tooth 19 spaced normally from the lower edge of the shield whereby, when the rocking arm 20 is manipulated, the shutter will be operated. The arm 20, as shown in Fig. 6, is so disposed as to operate immediately below the shield 12 and impinge against the tooth 19 to swing the shutter in opposition to the spring 17 and bring the notch 16 into alinement with the sight opening 13, the tooth preventing the arm swinging beyond the shutter without coming into engagement therewith. The arm 20 swings from side to side of the casing 1 but the tooth 19 clears the arm instantly upon an exposure being made and the spring 17 immediately closes the shutter. Upon return movement of the arm, its free end rides under the projection 18 in an obvious manner. In rear of the shutter, the lens 21 is mounted within the casing in axial alinement with the sight opening 13, as shown in Fig. 1. The shield 12 and the screen 10 are, of course, so connected and fitted in the casing that the leakage of light around the edges of either element will be prevented and the shutter 14, of course, fits closely to the shield 12 so as to exclude light except through the opening 13. The lens 21 may be mounted within the casing in any approved manner and is illustrated as being carried by a disk 22 to the rear side of which is secured a plate or bracket 23 provided below the disk 22 with a horizontal slot 24 to accommodate the arm 20, as shown in Figs. 1 and 3. The rocking arm 20 is fixed to the upper end of a pivot pin or rivet 25 which passes vertically through the bottom plate of the casing 1 in rear of the front end wall of the box 2, and to the lower end of this pivot is secured an actuating cam lever 26 which extends rearwardly within the box 2 immediately below the bottom plate of the casing 1 and is yieldably held in its normal position by a spring 27 attached at one end to the bottom of the casing and at its opposite end to the cam lever. This arrangement is shown most clearly in Fig. 4. The cam lever 26 is spaced slightly from the bottom plate of the casing 1 so that it may move freely and for the same reason the rocking arm 20 is offset, as at 28, so that the greater portion of its length will be spaced above the bottom plate of the casing, this formation also imparting some resiliency to the free end of the arm so that it may readily ride under the shutter when returning to its initial position. The lever 26 is constructed with an obliquely disposed slot 29, the walls of which constitute cam surfaces whereby rocking movement may be imparted to the lever when the sliding pin 30 is moved longitudinally of the device. This pin 30 is secured to and rises from a plate 31 which is secured to the upper end of the trigger 32, the said plate 31 resting slidably upon the bottom of the box 2 and fitting against the sides thereof whereby it will be held to a rectilinear path.

It will now be understood that, if the trigger 32, which depends through and below the bottom of the box 2, is pressed rearwardly, the plate or slide 31 will follow the movement and the pin 30, consequently, will be drawn rearwardly against the rear wall of the obliquely disposed cam slot 29 so that the lever 26 will be rocked about the pivot 25 in opposition to the spring 27 and consequently the rocking arm 20 will be caused to swing transversely of the casing 1 and bring its free end into engagement with the shutter to rock the shutter and make an exposure. Upon release of the trigger, it is returned to its forward initial position and the spring 27 then acts to return the cam lever 26 and the rocking arm 20 to their initial positions.

The bottom of the box 2 is constructed with a longitudinal slot 33 whereby the movement of the trigger is permitted and is held to a rectilinear path. Immediately above the plate 31, a slotted plate 34 is secured in the box 2, the said plate having a short longitudinal central slot 35 adjacent its front end to accommodate the pin 30 and provided through the greater portion of its length with a slot 36 which terminates near the rear end of the plate and is constructed with a rack 37 upon one side wall, and it may be noted at this point that the plate 31 is provided with a rear extension, indicated by dotted lines in Fig. 5, which is forked and spans the slot 36 and a pinion 38 which is mounted upon the bottom of the box and meshes with the rack 37. An upper keeper plate 39 is carried by the pin 30 and rests upon the upper side of the rack plate 34 so that the parts will be properly guided in operation and lateral movement of the pin and the slide will be prevented. At its rear end, the rack plate 34 is equipped with a central depending lip 40 extending through a slot 41 in the rear end portion of the bottom of the box 2 so that the rack plate will be held to its proper position in the box. The pinion 38 is loose upon a shaft 42 which is journaled in the bottom of the box 2 between the slots 33 and 41, and fixed upon the upper side of the pinion is a disk 43 carrying a pawl 44 which is spring pressed into engagement with a ratchet 45 secured upon the shaft 42 whereby upon movement of the rack plate 34 in one direction the shaft will be rotated and upon reverse movement of the rack plate the shaft will remain at rest. The shaft projects upwardly through the bottom of the main casing 1 and is equipped with a crosshead 46 of the usual type to engage a socket provided therefor in the film spool 47.

When the trigger is pressed rearwardly, as previously mentioned, the pin 30 moves rearwardly in the slot 35 so that the rack plate 34 remains at rest during the period of the exposure. However, the continued travel of the trigger and the pin will bring the pin into engagement with the rear end of the slot 35, whereupon the rack plate 34 will be actuated and the pinion 38 rotated, the pawl 44 then engaging the ratchet 45 so as to rotate the shaft 46 and wind film upon the spool 47. Upon release of the pressure upon the trigger, it is automatically returned to its forward initial position, the pawl 44 then riding over the ratchet 45 without actuating the winding shaft 42.

Secured to the trigger 32 immediately below the box 2 is a tubular supporting arm 48, the free end of which plays through an opening in the front wall of the handle member 3 of the casing. A guide pin 49 is secured to the rear end of the handle member 3 and projects forwardly through the front wall thereof in axial alinement with the supporting tubular arm 48 and enters the rear end of the said arm, as indicated by the dotted lines in Fig. 1, whereby to support and guide the arm. A buffer spring 50 is mounted upon the pin 49 between the rear end of the arm 48 and an abutment 51 on the pin whereby to absorb any possible shock which may be occasioned by sudden application of pressure to the trigger. The abutment 51 projects beyond the sides of the pin 49 to provide bearing surfaces engaged by the upper ends of return levers 52 which are pivoted at their lower ends within the handle member 3 of the casing and have their upper ends disposed in contact with the said abutment, as shown in Fig. 1. Contractile springs 53 are disposed at opposite sides of the return levers 52 and have their upper ends secured to the casing adjacent the junction of the front wall of the handle section 3 with the bottom of the box 2 and their rear ends attached to lugs or offsets 54 projecting upwardly and rearwardly from the upper edges of the return levers 52. When the trigger is pressed rearwardly, the return levers 52 will, of course, be swung toward the rear wall of the handle section 3 and the springs 53 will be extended so that, when the pressure upon the trigger is released, the springs will at once contract and return the parts to their initial positions. It may be noted that in the normal position of the parts the abutment 51 lies under the tongue 40 and the said tongue is constructed with lateral extensions or wings 55 at its lower end which engage under the bottom of the box 2 and thereby aid in holding the rack plate and the plates cooperating therewith in proper relation to the bottom of the box.

The film, indicated at 56, is carried by spools 47 and 57 as is usual and is wound from the spool 57 onto the spool 47, the exposed portion of the film being arranged to travel around idler rollers 58 immediately in rear of an opening 59 in the front end wall of the carrier 5. The carrier 5, as will be understood upon reference to Figs. 1 and 2, is a three sided structure having its rear end open and is preferably constructed of sheet metal. The spools are inserted into the carrier through the open side thereof and are held in the proper position in the carrier by studs 60 carried by a keeper or latch plate 61 and engageable through openings provided therefor in the top side of the carrier, as will be understood upon reference to Fig. 1. It will also be understood upon reference to Fig. 1 that, when the carrier with the spools therein is inserted through the top of the casing, the lower ends of the spools will engage the crosshead 46 and also engage a stud 62 in the usual manner. A leaf spring 63 is secured to the inner surface of the top of the carrier 5 to press upon the spools and hold them in proper engagement with the crosshead 46 and the stud 62, as will be understood. To prevent loosening or unwinding of the exposed film which is wound upon the rear spool 47, we provide a brake shoe 64 which may be of any suitable form and is carried by the upper end of a lever 65 fulcrumed within the casing 1 adjacent the rear end thereof and equipped with a counterbalance arm 66 extending through the rear end of the box 2. This counterbalance arm 66 plays through a slot 67 in the bottom of the casing 1 and through the slot 41 in the bottom of the box 2 so that lateral movement of the lever will be prevented and the shoe will always be maintained in proper position to engage the film without injuring the same.

The entire outer casing may conveniently be made of sheet metal so that it will be light and may be easily produced in a stamping machine. The several parts of the casing will be connected by bolts so that the proper rigidity and durability will be attained and it will be easily seen that we have provided a very compact camera in which a single element will effect the operation of all the working parts. While the operation of the shutter and the feeding of the film are timed to occur in sequence, the feeding of the film follows so closely upon the closing of the shutter that the entire operation is practically instantaneous. The exposure is made so that there is no liability of over-exposure and the feeding of the film is accomplished so quickly and accurately that a second exposure may be made immediately after a first exposure, the rapidity of operation depending solely upon the ability of the operator to manipulate the trigger.

Having thus described the invention, we claim:

1. A camera comprising a casing, a lens mounted in the front end of the casing, a shutter in advance of the lens within the casing, means in rear of the lens for supporting a film, a rocking arm mounted pivotally in the casing below the film-supporting means and having its front end free and arranged to engage and actuate the shutter, a cam member connected with said rocking arm, a trigger slidably mounted on the casing, an element carried by the trigger to actuate said cam element, and means actuated by the trigger for feeding the film.

2. A camera comprising a casing, a lens mounted in the front end of the casing, a shutter within the casing in advance of the lens, means for supporting a film in rear of the lens, a rocking arm arranged to engage and operate the shutter, a cam lever connected with said arm and having a cam slot formed therein, a trigger slidably mounted in the casing, a pin carried by the trigger and playing in the cam slot, and means for operating the film-supporting means having a lost motion connection with said pin.

3. A camera comprising a casing, a lens mounted in the front end of the casing, a shutter mounted in the casing in advance of the lens, means for supporting a film in rear of the lens, a trigger slidably mounted upon the casing, means including a pin carried by the trigger for actuating the shutter, a rack plate slidably mounted in the casing and having a longitudinal slot through which the pin carried by the trigger plays, a pinion meshing with said rack plate, and connections between said pinion and the film-supporting means whereby upon movement of the rack plate in one direction the film will be wound and upon movement of the rack plate in the opposite direction the film will remain at rest.

4. A camera comprising a casing, film-holding means mounted in the rear portion of the casing, a lens in the casing in advance of the film-holding means, a shutter in advance of the lens, a trigger slidably mounted below the casing, operative connections between the trigger and the shutter and between the trigger and the film-holding means, a guide pin carried by the casing below the said operative connections, a tubular arm extending from the trigger and engaging over said pin, and return levers acting upon the tubular arm to yieldably hold the same and the trigger in their initial positions and return them to said positions after actuation.

5. A camera comprising a casing, a lens mounted in the casing near the front end thereof, a shutter in advance of the lens, means for supporting a film in rear of the lens, a trigger slidably mounted upon the casing, operative connections between the trigger and the shutter, operative connections between the trigger and the film-holding means, an arm extending rearwardly from the trigger and supported by the casing, return levers pivotally mounted in the casing below said arm, and means for yieldably holding the upper ends of said levers in engagement with the said arm whereby to return the trigger to initial position after actuation.

In testimony whereof we affix our signatures.

WILLIAM E. VAN NESS. [L. S.]
HUGH T. BRADY. [L. S.]
DAVID A. BENWAY. [L. S.]